United States Patent
Nakahara et al.

(10) Patent No.: US 8,728,316 B2
(45) Date of Patent: May 20, 2014

(54) MEMBRANE FILTER UNIT

(75) Inventors: Yoshihito Nakahara, Aichi (JP);
Tetsuya Torichigai, Aichi (JP);
Hiroyuki Okazaki, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 680 days.

(21) Appl. No.: 12/600,249

(22) PCT Filed: May 14, 2007

(86) PCT No.: PCT/JP2007/059899
§ 371 (c)(1),
(2), (4) Date: Apr. 21, 2010

(87) PCT Pub. No.: WO2008/139617
PCT Pub. Date: Nov. 20, 2008

(65) Prior Publication Data
US 2010/0200481 A1    Aug. 12, 2010

(51) Int. Cl.
*B01D 65/02* (2006.01)
*B01D 63/02* (2006.01)

(52) U.S. Cl.
USPC .............. 210/321.8; 210/321.64; 210/321.69; 210/321.84; 210/151; 210/500.23

(58) Field of Classification Search
USPC .............. 210/321.69, 321.75, 321.84, 321.89, 210/321.9, 636, 500.23, 257.2, 151, 321.63, 210/321.64, 321.81, 332, 333.01, 346, 353, 210/354, 407, 408, 410, 411, 486
See application file for complete search history.

(56) References Cited

U.S. PATENT DOCUMENTS

| | | | |
|---|---|---|---|
| 5,192,456 A * | 3/1993 | Ishida et al. | 210/791 |
| 5,248,424 A * | 9/1993 | Cote et al. | 210/636 |
| 5,480,553 A * | 1/1996 | Yamamori et al. | 210/650 |
| 6,280,626 B1 * | 8/2001 | Miyashita et al. | 210/636 |
| 6,524,481 B2 * | 2/2003 | Zha et al. | 210/636 |
| 6,656,356 B2 * | 12/2003 | Gungerich et al. | 210/321.8 |

FOREIGN PATENT DOCUMENTS

| | | | |
|---|---|---|---|
| JP | 7-299337 | * | 11/1995 |
| JP | 7299337 A | | 11/1995 |
| JP | 8-257372 A | | 10/1996 |

(Continued)

OTHER PUBLICATIONS

English langugae machine translation of JP-7-299337.*

(Continued)

*Primary Examiner* — David C Mellon
*Assistant Examiner* — Pranav Patel
(74) *Attorney, Agent, or Firm* — Fitch, Even, Tabin & Flannery LLP

(57) ABSTRACT

A membrane filter unit includes a hollow fiber membrane module with a plurality of sheet-like hollow fiber membrane elements arrayed in parallel at predetermined intervals, each of the hollow fiber membrane elements obtained by arranging a great number of porous hollow fiber membranes in parallel, and an air diffuser arranged below the hollow fiber membrane module for releasing minute bubbles toward a lower end of the hollow fiber membrane module and generating a gas-liquid mixed flow vertically swirling between an inner space and an outer space of the hollow fiber membrane module. The membrane filter unit has a residue eliminating mechanism for forming a forced flow in part of the mixed flow between the porous hollow fiber membranes and between the sheet-like hollow fiber membrane elements of the fiber membrane module.

3 Claims, 7 Drawing Sheets

(56) References Cited

FOREIGN PATENT DOCUMENTS

| | | | |
|---|---|---|---|
| JP | 9047762 | A | 2/1997 |
| JP | 09215980 | * | 8/1997 |
| JP | 9215980 | A | 8/1997 |
| JP | 11244674 | A | 9/1999 |
| JP | 2000051672 | A | 2/2000 |
| JP | 2000-084553 | A | 3/2000 |
| JP | 2005-144290 | A | 6/2005 |
| JP | 2007152179 | A | 6/2007 |
| WO | WO-03101896 | * | 12/2003 |
| WO | WO 03101896 | A1 | 12/2003 |
| WO | WO2006064808 | A1 | 6/2006 |

OTHER PUBLICATIONS

English langugae machine translation of WO-03101896.*

* cited by examiner

Prior Art

MEMBRANE FILTER UNIT

CROSS-REFERENCE TO RELATED APPLICATIONS

This is a U.S. National Phase of International Application PCT/JP2007/059899, filed May 14, 2007, the entire disclosure of which application is hereby incorporated herein by reference.

TECHNICAL FIELD

The present invention relates to a membrane filter unit applied to an activated sludge treatment method, which biochemically treats an organic matter and carcass thereof included in industrial wastewater and domestic wastewater or wastewater including microorganism and bacteria and performing solid-liquid separation using a separation membrane.

BACKGROUND ART

As a denitrification method in the wastewater treatment method, an activated sludge recycle process in which sludge is circulated between an anoxic tank in which free oxygen is not present and an aeration tank, which releases air into the sludge from an air diffuser, ammoniac nitrogen is oxidized to nitrate-nitrogen in the aeration tank, and the nitrate-nitrogen is reduced in the anoxic tank to be discharged out of a system as nitrogen gas has been conventionally widely performed. However, according to this method, although nitrogen may be efficiently removed, phosphorous is not sufficiently removed. This is because an anaerobic degree in the anoxic tank is not sufficiently raised due to dissolved oxygen, the nitrate-nitrogen and the nitrite-nitrogen included in circulated water from an aerobic tank, and phosphorous release from phosphorous accumulating bacteria is not sufficiently performed.

Therefore, when it is required to simultaneously perform denitrification and dephosphorization, a so-called $A_2/O$ method in which the denitrification and the dephosphorization are biochemically performed by arranging an obligatory anaerobic tank, which does not include the free oxygen and bound oxygen such as a nitric acid and a nitrous acid, before the anoxic tank (denitrification tank) of the above-described activated sludge recycle process is used. In the obligatory anaerobic tank, a polyphosphoric acid by the polyphosphate accumulating bacteria is hydrolyzed to dissolve out the phosphorous and introduces a biochemical oxygen demand (hereinafter, referred to as a BOD) component into a bacteria cell. It is said that, in order to maintain an obligatory anaerobic condition, the BOD is required to be 50 mg/L or higher.

However, there is a problem in the wastewater treatment method according to the $A_2/O$ method that an obligatory anaerobic tank should be additionally provided and a large device installation area is required as compared to the activated sludge recycle method.

Therefore, for example, WO03/101896 (Patent Document 1) discloses the wastewater treatment method capable of removing the nitrogen and the phosphorous only by the two treatment tanks, which are the anoxic tank and the aeration tank, without the aggregating agent. The wastewater treatment method is the activate sludge treatment apparatus for performing the so-called activated sludge recycle method, configured to circulate the sludge between the anoxic tank and the aeration tank to biochemically treat the wastewater, and this is configured to take out the sludge being the circulated fluid below the air diffuser disposed on the lowest position in the aeration tank when sending the sludge being the circulated fluid from the aeration tank to the anoxic tank and sets the DOC (hereinafter, referred to as the DOC) at the site to take out the sludge to 0.5 mg/L or less, and sets the DOC at the site at which the sludge sent from the aeration tank enters the anoxic tank to preferably 0.2 mg/L or less. It is said that, by doing so, both of the nitrogen and the phosphorous may be removed by using only the two treatment tanks, which are the anoxic tank and the aeration tank, without using the aggregation agent and the like.

In the meantime, in the above-described aeration tank in this type of activated sludge treatment, as disclosed in the Patent Document 1, the membrane filter unit provided with a hollow fiber membrane module assembled by arranging in parallel a plurality of sheet-like hollow fiber membrane elements in which a great number of porous hollow fibers are used so as to be parallel, and the air diffuser, which is a minute bubble generating unit, arranged below the hollow fiber membrane module for releasing the air toward the hollow fiber membrane module is often used for a reason that biochemical treatment efficiency and filtration efficiency of the activated sludge are high.

A predetermined amount of air is released from the air diffuser into the sludge as minute bubbles, this becomes a gas-liquid mixed flow while moving upward in the sludge and moves upward, flows upward in a gap in the hollow fiber membrane module, and the flow, which passes through the hollow fiber membrane module, flows down along an outer side of the membrane filter unit to form a gas-liquid mixed swirling flow. While the gas-liquid mixed swirling flow vertically swirls, the oxygen in the air becomes the free oxygen and is dissolved in the sludge, decomposes or nitrifies the organic matter and the like, and/or, introduces the phosphorous into the polyphosphate accumulating bacteria and allows the same to grow to allow the sludge to grow, and also, as disclosed in Japanese Patent Laid-Open Publication No. 2000-51672 (Patent Document 2) and Japanese Patent Laid-Open Publication No. 2000-84553 (Patent Document 3), for example, a contaminant attached to the hollow fiber membrane element is exfoliated from the same to clean the same by so-called air scrubbing for allowing the gas-liquid mixed flow to act on the component hollow fiber membrane of the hollow fiber membrane module to oscillate. At the same time, the sludge is sucked by a suction pump and the solid-liquid separation is performed through the porous hollow fiber membrane, and treated water is sent to an external treated water tank through a hollow portion of the hollow fiber membrane.

Patent Document 1: WO03/101896
Patent Document 2: Japanese Patent Laid-Open Publication No. 2000-51672
Patent Document 3: Japanese Patent Laid-Open Publication No. 2000-84553

DISCLOSURE OF THE INVENTION

Problem to be Solved by the Invention

As disclosed in the Patent Documents 1 to 3, an aeration process is generally included in the biochemical activated sludge treatment using this type of hollow fiber membrane module. The hollow fiber membrane module is obtained by arranging a great number of porous hollow fiber membranes in parallel with required gaps and fixing the whole to a rectangular frame member by means of fixing resin to form the sheet-like hollow fiber membrane element, as described above. A plurality of the hollow fiber membrane elements are arranged in parallel at required intervals to form a rectangular parallelepiped hollow fiber membrane module. The gas-liquid mixed swirling flow generated by the bubbles released from the air diffuser arranged below the hollow fiber membrane module is accompanied with a disturbed flow due to the scrubbing to the porous hollow fiber membrane.

On the other hand, in the sludge to be treated, the organic matter and various solid materials such as fiber, yarn waste, hair, and a paper piece are mixed. These mixtures are carried upward by the gas-liquid mixed swirling flow, which flows upward from below the hollow fiber membrane module and often get stuck on components of the hollow fiber membrane module. In this case, it is not possible to prevent especially the fiber, the yarn waste, the hair and the like from getting stuck on a frame body of the hollow fiber membrane module and the porous hollow fiber membrane or entwining between adjacent porous hollow fiber membranes and between a take-out pipe of the treated water and the porous hollow fiber only by a scrubbing action by the gas-liquid mixed flow passing through the hollow fiber membrane module by the normal air diffuser. When residues such as the fiber, the yarn waste and the hair get stuck or entwine, they bundle a great number of hollow fiber membranes, and not only the filtration performance is lowered but also the dissolved oxygen is not spread between the hollow fiber membranes, so that the sludge treatment is not performed smoothly. In such a case, it is necessary to raise the hollow fiber membrane module from the aeration tank to carry out of the tank and replaces the same with a new hollow fiber membrane module.

The present invention is made to solve such a problem, and a specific object thereof is to prevent the hair, the fiber and the paper piece included in the wastewater from bundling the porous hollow fiber membranes of the hollow fiber membrane module or from entwining or getting stuck between the hollow fiber membrane and a surrounding frame member, thereby ensuring durability of the hollow fiber membrane module in the above-described activated sludge treatment apparatus.

Means for Solving the Problems

Such an object is effectively achieved by a membrane filter unit applied to an activated sludge treatment method comprising an anaerobic tank and an aerobic tank, with a membrane filter unit immersed in the aerobic tank, to sequentially biologically treat wastewater to separate into activated sludge and treated water, the membrane filter unit being characterized by comprising: a hollow fiber membrane module in which a plurality of sheet-like hollow fiber membrane elements obtained by arranging a great number of porous hollow fibers in parallel with narrow gaps are arrayed in parallel at predetermined intervals with the porous hollow fibers oriented in a vertical direction; and a minute bubble generating unit arranged below the hollow fiber membrane module for releasing minute bubbles toward a lower end of the module to generate a gas-liquid mixed flow vertically swirling between an inner space and an outer space of the hollow fiber membrane module, wherein each hollow fiber membrane element of the hollow fiber membrane module in the membrane filter unit has a first area in which a gap between porous hollow fiber membranes composing the hollow fiber membrane element is narrow and a second area forming a wide gap between the narrow gap areas, which is a basic configuration of the present invention.

A part of intervals between a plurality of hollow fiber membrane elements adjacent in a parallel direction of the hollow fiber membrane module is formed so as to be wide, and an interrupting member is arranged on a lower end entrance of the part of the intervals for the gas-liquid mixed flow. Also, there is a case in which the membrane filter unit is characterized by having a wall material arranged so as to enclose around the hollow fiber membrane module and the minute bubble generating unit with a top and a bottom opened, and having a skirt portion with a hem spread and extended on a lower end of the wall material. It is desirable that an extending length of the skirt portion in a horizontal direction is 1 mm or longer and 1000 mm or shorter, and an inclination angle of the skirt portion relative to a vertical line extending vertically downward from a lower end of the wall material may be made 10 degrees or more and 70 degrees or less.

Also, both of the interval between the above-described hollow fiber membrane elements and the gap between the porous hollow fiber membranes composing the hollow fiber membrane element may be made irregular at the same time.

Effect of the Invention

As described above, the residues such as the fibers, yarn of various materials and the paper piece (nonwoven fabric) are mixed into sewage and industrial wastewater, and although a large solid material is eliminated by means of a screen at a stage of raw water, the residues, which are especially elongated, soft and flexible such as the fiber and the hair, pass through the screen to be mixed into the wastewater and flows to the treatment tank. When treating the wastewater, especially when the above-described aeration treatment is performed, the residues are carried by the gas-liquid mixed flow and move upward to flow to the hollow fiber membrane module. The hollow fiber membrane module is composed of a great number of porous hollow fiber membranes and the frame body for supporting them as described above, so that the residues get stuck on or entwine with the porous hollow fiber membranes and the frame body, and bundle a plurality of porous hollow fiber membranes. Also, the residues entwine with each other to form a ball-shape. Such an effect by the residues is large, and this significantly lowers the filtration performance of the hollow fiber membrane element, for example. It is substantially difficult to remove the residues in the tank to recover the degraded performance of the hollow fiber membrane element, and it is required to raise the membrane filter unit to carry out of the tank and replace the hollow fiber membrane element with which the residues entwine with the new hollow fiber membrane element.

Then, in the present invention, in order to avoid occurrence of the above-described trouble, a second area in which a part of the gaps between a great number of porous hollow fiber membranes composing each of the plurality of hollow fiber membrane elements is made wider than other gaps is formed. A part of the gas-liquid mixed flow, which flows in a gap between a plurality of the hollow fiber membrane elements from below and flows upward, moves between the hollow fiber membrane elements across the gap formed to be wide, generates the disturbed flow in the gas-liquid mixed flow, which moves upward between the hollow fiber membrane elements, carries the residues, which tend to get stuck or entwine with the first area of which surrounding gap is narrow, by the flow to move upward, and carries the same out of the membrane filter unit. Therefore, after long-term treatment, the residues are hardly solidified in each hollow fiber membrane element in a ball-shape, and at the same time, a mass of the residues does not attach to the hollow fiber membrane element and the like, and a plurality of porous hollow fiber membranes are not bundled by the residues, so that durability to long-term usage may be obtained.

Also, as described above, as another aspect of the present invention, a part of the intervals between the hollow fiber membrane elements to which the above-described residue eliminating mechanism lies adjacent in an array direction of each of the hollow fiber membrane modules is formed so as to be larger than other intervals. In this manner, to form a part of the intervals between the hollow fiber membrane elements adjacent in the array direction of the hollow fiber membrane module so as to be simply larger than other intervals is also disclosed in the above-described Patent Document 2, for example. However, according to the disclosure of the Patent Document 2, by providing an appropriate gap between the sheet-like hollow fiber membrane elements, the gas-liquid mixed flow generated by the bubbles from the air diffuser rapidly moves upward in the large gap portion between the hollow fiber membrane elements interposing the gap. Therefore, it is said that the hollow fiber membrane element is efficiently scrubbed, and at the same time, absorption of the solid material to the membrane surface is inhibited, and the filtration operation develops.

It is described that, when a distance of the gap is too small, a plurality of gas-liquid mixed flows collide with each other and hardly move upward, the scrubbing of the hollow fiber membrane element is not efficiently performed and a cleaning effect is degraded, and when the distance of the gap is too large, although the gas-liquid mixed flow rapidly moves upward without resistance, this hardly contacts with the hollow fiber membrane element, so that an appropriate cleaning effect is not obtained.

That is to say, the large interval in the Patent Document 2 is to obtain an appropriate upward flow of the gas-liquid mixed flow, and to smoothly perform the filtration operation while achieving an air scrubbing effect and inhibiting the absorption of the contaminant to the membrane surface at the same time.

On the other hand, although the above-described aspect of the present invention conforms to the above-described Patent Document 2 in that the interval between the hollow fiber membrane elements is made larger than other intervals, in the present invention, the residue eliminating mechanism arranges an interrupting member arranged on the lower end opening of a part of the large interval formed between the adjacent sheet-like hollow fiber membrane elements, thereby substantially blocking the gas-liquid mixed flow to flow into the opening by blocking the opening by the interrupting member. The interrupting member is composed of an elongated plate member, and a space may be provided between the same and the opening. In this case, the plate member may be arranged so as to be inclined such that the gas-liquid mixed flow flows to a plurality of hollow fiber membrane elements adjacent to the opening.

By such a configuration, the gas-liquid mixed flow, which moves upward from below the hollow fiber membrane module is gathered toward the hollow fiber membrane elements arranged at normal intervals by the interrupting member to flow between the hollow fiber membrane elements. The gas-liquid mixed flow flowing between the hollow fiber membrane elements in this manner spreads to the large interval area formed above the interrupting member and while changing its direction, vigorously flows to a portion above the interval area. By a transverse flow and the upward flow at that time, the residues, which tend to get stuck on the porous hollow fiber membrane and the hollow fiber membrane element, and the residues, which tend to be solidified into the ball-shape, are carried out of the hollow fiber membrane module. In this manner, although the residues flowing between the hollow fiber membrane elements tend to get stuck on the porous hollow fiber membrane, the transverse flow, which flows across the hollow fiber membrane carries the residues, which tend to get stuck on the hollow fiber membrane toward the large interval area formed above the interrupting member, and carries the same in the flow, which vigorously moves upward in the interval area to allow the same rapidly flow out of the hollow fiber membrane module.

In a normal membrane filter unit, periphery of the hollow fiber membrane module and the air diffuser arranged below the same are enclosed by a wall material of which top and bottom are opened. The bubbles generated from the air diffuser moves upward to form the mixed flow with the sludge. The mixed flow moves upward by passing through the hollow fiber membrane module of the membrane filter unit to flow out of an upper surface opening of the unit, moves downward the outside of the unit from above, joins with the upward flow generated by the bubbles released from the air diffuser from a bottom surface opening of the unit to move upward inside the membrane filter unit, and forms the swirling flow vertically circulating inside and out of the membrane filter unit by repeating them.

As yet another typical aspect of the present invention, when a skirt portion with a spread hem extending downward is provided on the lower end of the wall material, the downward flow flowing downward from above around the wall material of the membrane filter unit in the above-described gas-liquid mixed swirling flow temporarily spreads at the skirt portion so as to be broaden toward the end; however, this becomes the upward flow by being drawn to a center portion of a bottom surface opening of the membrane filter unit by the gas-liquid mixed upward flow generated by the bubbles released from the air diffuser, so that the gas-liquid mixed flow more than that without the skirt portion is gathered to flow in the hollow fiber membrane module of the membrane filter unit.

Therefore, a rate of the flow, which passes through the hollow fiber membrane module, is increased, and the residues, which tend to get stuck on the component of the module, are allowed to flow upward with the mixed flow with a flow rate of the gas-liquid mixed flow to be carried out of the membrane filter unit. Therefore, the residues, which get stuck on the component of the membrane filter unit and solidified in the ball-shape hardly bundle a plurality of porous hollow fiber membranes and hardly attaches to the hollow fiber membrane element, and the long-term usage of the membrane filter unit is ensured. Meanwhile, when an extending length of the skirt portion is shorter than 1 mm, the gathered amount of the gas-liquid mixed flow is too small, and the flow amount for eliminating the residues may not be obtained. Also, when this is longer than 1000 mm, the flow amount of the surrounding gas-liquid mixed flow to be gathered is too large, and the flow amount of the surrounding gas-liquid mixed flow may not be gathered only by the upward flow of the gas-liquid mixed flow by the moving-up of the bubbles generated from the air diffuser, to the contrary, the flow amount passing through the hollow fiber membrane module does not reach the flow amount to carry away the residues, so that the poor filtration due to the residues easily occurs. Also, when an inclination angle of the skirt portion relative to a vertical line extending vertically downward from the lower end of the wall material is less than 10 degrees, the gathered amount of the gas-liquid mixed flow is small and the result is substantially the same as the conventional one. Also, when this is larger than 70 degrees, the above-described downward flow diffuses in various directions, so that the so-called swirling flow is not generated.

EXPLANATIONS OF REFERENCE NUMERALS

Figure 1:
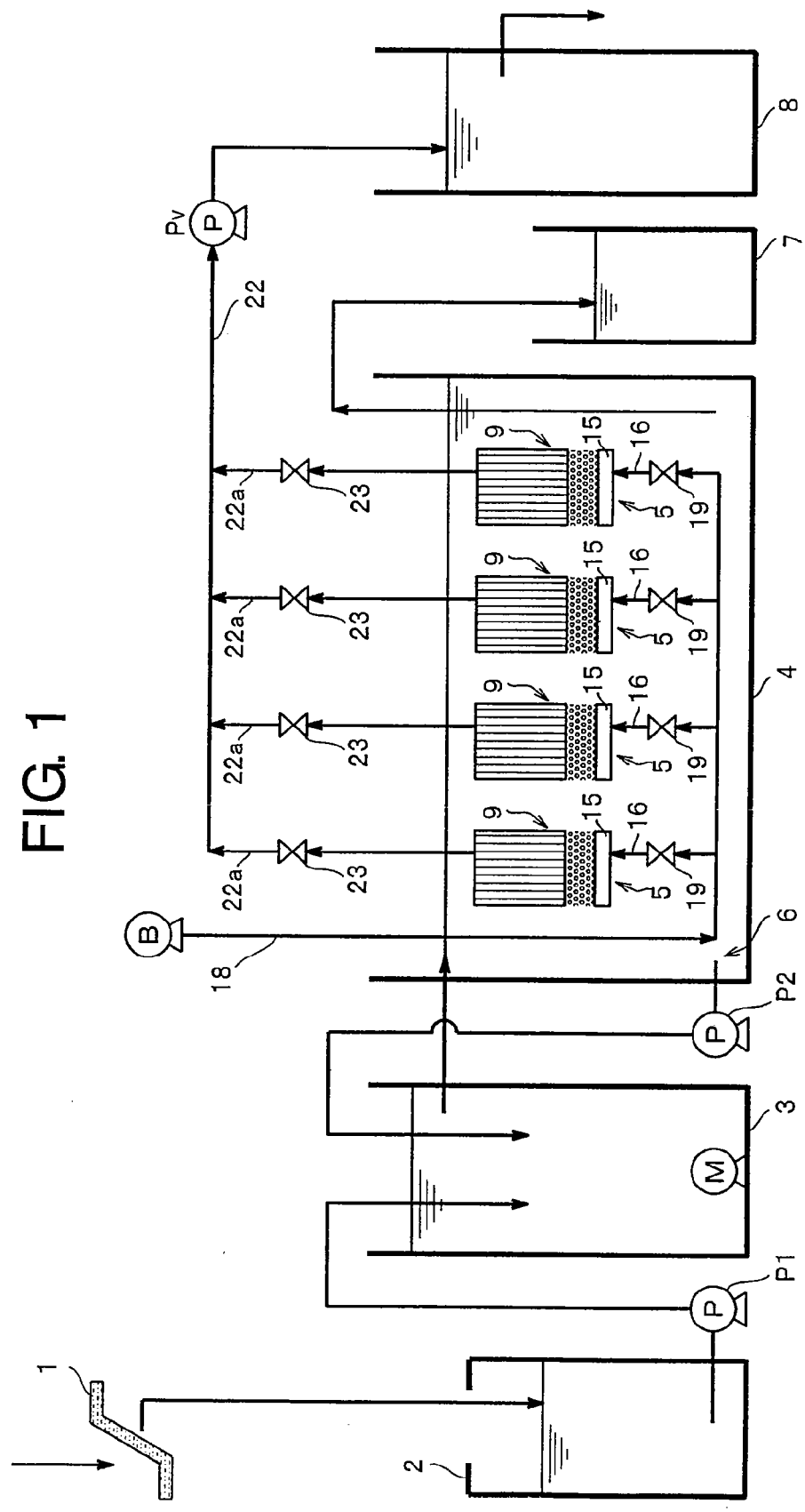
FIG. 1 is a schematic configuration diagram of a membrane separation activated sludge treatment apparatus to which a membrane filter unit of the present invention is applied.

1 Fine screen
2 Raw water controlling tank
3 Anoxic tank
4 Aeration tank
5 Membrane filter unit
6 Take-out site of circulated fluid
7 Treated water tank
8 Sludge storage tank
9 Hollow fiber membrane module
10 Hollow fiber membrane element
10a Hollow fiber membrane
10g Hollow fiber membrane element group
11 Membrane sheet
11a Potting material
12 Filtrate water take-out tube
12a Filtrate water take-out opening
12b L-shaped joint
13 Lower frame
14 Vertical rod
15 Air diffuser
16 Air introducing pipe (branching pipe line)
17 Diffusing pipe
18 Air main pipe
19 Open/close valve
20 Upper wall material
21 Catchment header pipe
21a Catchment opening
21b L-shaped joint
21c Water intake
22 Suction pipe line
22a Branching pipe line
23 Open/close valve
24 Lower wall material (skirt portion)
24a Support column
28 Plate member (residue eliminating mechanism)
P1 First fluid sending pump
P2 Second fluid sending pump
Pv Suction pump
A First area (narrow gap area)
B Second area (wide gap area)
C Aeration blower

BEST MODES FOR CARRYING OUT THE INVENTION

Hereinafter, a preferred embodiment of the present invention is specifically described based on a typical example with reference to drawings.

FIG. 1 shows an example of a schematic structure of an activated sludge treatment apparatus to which a membrane filter unit of the present invention is applied.

According to the activate sludge treatment apparatus, wastewater (raw water) from which a relatively large solid content is removed by means of a fine screen 1 is introduced into a raw water controlling tank 2. Herein, a fluid level is measured by a fluid level measuring device not shown, and the fluid level in the tank is controlled within a predetermined range by intermittent working of a first fluid sending pump P1. The raw water sent by the first fluid sending pump P1 is introduced into an anoxic tank 3 and thereafter, allowed to flow into an adjacent aeration tank 4 using the raw water, which overflows from the anoxic tank 3. A great number of membrane filter units 5 are arranged so as to be immersed in the aeration tank 4. Treated water obtained by membrane separation into activated sludge and the treated water by the membrane filter unit 5 is sent to a treated water tank 8 by a suction pump Pv. On the other hand, the solid content (suspended matter) of the sludge grown by aeration treatment in the aeration tank 4 is deposited at a bottom portion of the tank by its own weight, and excess sludge is stored in a sludge storage tank 7. Also, a part of the sludge in the aeration tank 4 is returned to the above-described anoxic tank 3 by a second fluid sending pump P2 to circulate.

According to this membrane separation activated sludge treatment apparatus, the raw water is biologically purified by the activated sludge in the anoxic tank 3 and the aeration tank (aerobic tank) 4. Nitrogen is removed by a so-called nitrification denitrification reaction by circulating the sludge between the anoxic tank 3 and the aeration tank 4. An organic matter converted into a biochemical oxygen demand (BOD) is aerobically oxidized and decomposed mainly by air discharged from an air discharging unit of the membrane filter unit 5, which is an aeration device arranged in the aeration tank 4. Also, phosphorous is removed by being introduced into a body of microorganisms as a polyphosphoric acid by an action of the microorganisms (phosphorous accumulating bacteria) in the sludge. The microorganisms introduce the phosphorous in an aerobic state and release the phosphorous accumulated in the body thereof in an anaerobic state. When the phosphorous accumulating bacteria are repeatedly exposed to the anaerobic state and the aerobic state, they absorb more phosphorous in the aerobic state than the phosphorous released in the anaerobic state.

A part of nitrogen compounds such as biological excretion and carcass is assimilated into plant and bacteria as a fertilizer. Also, a part of such nitrogen compounds is oxidized to a nitrous acid and a nitric acid by autotrophic ammonia-oxidizing bacteria and autotrophic nitrite-oxidizing bacteria under an aerobic condition with high level of oxygen. On the other hand, under an anaerobic condition without oxygen, microorganisms referred to as denitrifying bacteria generate the nitrous acid from the nitric acid in place of the oxygen, and further reduce the same to dinitrogen monoxide and nitrogen gas. This reduction reaction is referred to as the above-described nitrification denitrification reaction.

Although the tank from which fluid sending is performed using the pump is not necessarily limited in the circulation of the sludge between the anoxic tank 3 and the aeration tank 4, in general, the fluid is sent from the aeration tank to the anoxic tank 3 using the second fluid sending pump P2 and is allowed to flow from the anoxic tank 3 into the aeration tank 4 by the overflow. In this embodiment, DOC at a site at which circulated fluid from the aeration tank 4 enters the anoxic tank 3 is set to 0.2 mg/L or less, and/or, the DOC at a site at which the circulated fluid is taken out of the aeration tank 4 is set to 0.5 mg/L or less, so that flow of dissolved oxygen in the anoxic tank 3 is inhibited and an anaerobic degree in the anoxic tank 3 is sufficiently maintained, thereby promoting release of the phosphorous.

When the dissolved oxygen, a nitrate ion and a nitrite ion are not substantially present in the anoxic tank 3, the organic matter is anaerobically decomposed, and then, the polyphosphoric acid accumulated in the bacteria is released out of a bacteria cell as a phosphoric acid. In this embodiment, it is preferable that the DOC at a site at which circulated sludge is returned from the aeration tank 4 to the anoxic tank 3 is set to 0.2 mg/L or less, and removability of the phosphorous is more stable when this is 1 mg/L or less, and this is further stabilized in a case of 0.05 mg/L or less, so that this is further preferable. Meanwhile, the DOC may be measured using a normal DO meter by a diaphragm electrode method.

In order to set the DOC at a site 6 at which the circulated fluid (sludge) is taken out of the aeration tank 4 to 0.5 mg/L or less, it is preferable that the site at which the sludge is taken out of the aeration tank 4 to the anoxic tank 3 is made an accumulating portion of the sludge. The accumulating portion of the sludge is intended to mean the site, which is hardly affected by flow of the sludge by the aeration. For example, by providing a space between the membrane filter unit 5 and the bottom portion of the aeration tank 4, the sludge in a portion below the membrane filter unit 5 is not stirred well, so that this becomes the accumulating portion.

Therefore, as shown in FIG. 1, by taking out the sludge from below the position of the membrane filter unit 5, the DOC at the site 6 at which the circulated fluid (sludge) is taken out of the aeration tank 4 may be set to 0.5 mg/L or less. Meanwhile, when a plurality of membrane filter units 5 are arranged in parallel in the aeration tank 4, the site at which the circulated fluid (sludge) is taken out is set below the aeration device. Also, it is preferable that the site at which the sludge is taken out is located below the membrane filter unit 5 with a distance of 20 cm or longer, and it is further preferable that the distance is 30 cm or longer.

The flow of the sludge in the aeration tank 4 is such that the sludge moves upward along with moving up of bubbles from an air outlet mainly in an aerated portion by the membrane filter unit 5, and the sludge moves downward in the portion not aerated, thereby an entire sludge is stirred. At that time, when an oxygen utilization rate (rr) of the sludge in the aeration tank 4 is maintained high, the oxygen is rapidly consumed in the portion not aerated, so that a site at which the dissolved oxygen is lowered may be easily formed in the aeration tank 4. Herein, the oxygen utilization rate (rr) of the sludge in the aeration tank 4 is intended to mean the oxygen utilization rate of the sludge taken from the aerated portion of the aeration tank 4, and a measurement method thereof may be obtained according to the Sewage Test Method (Japan Sewage Works Association, 1997).

Figure 2:
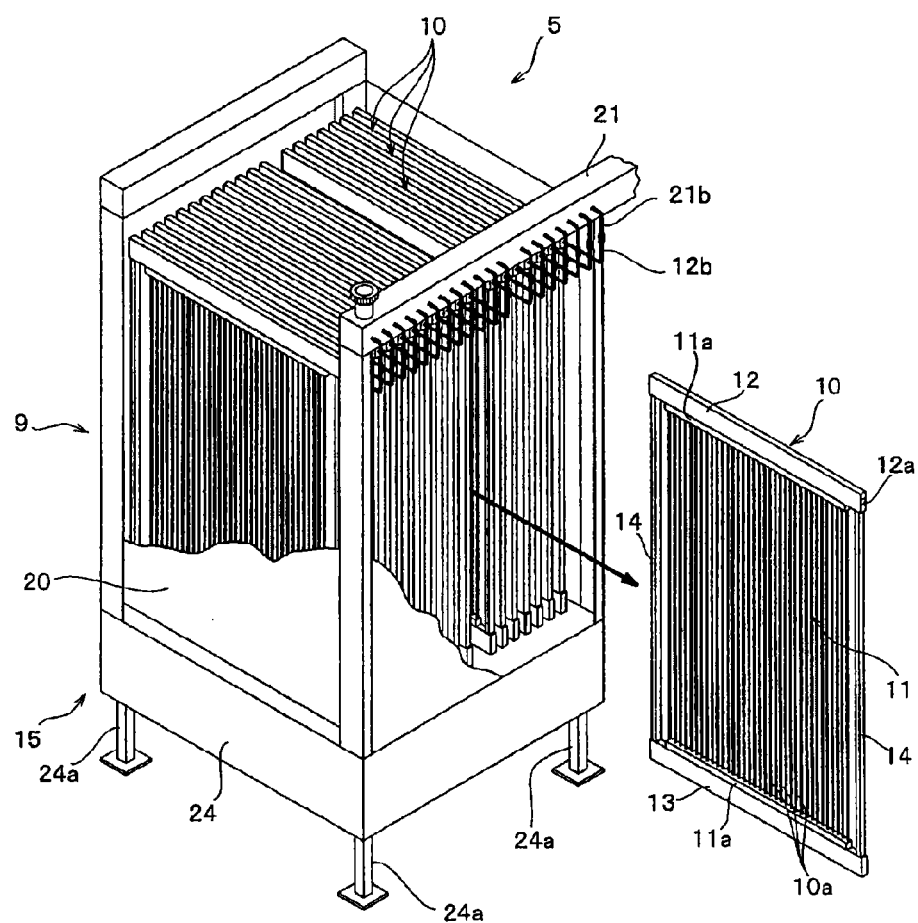
FIG. 2 is a partially-broken cubic diagram of an entire configuration of a normal membrane filter unit.

FIG. 2 shows a typical example of a normal membrane filter unit 5. As shown in this drawing, the membrane filter unit 5 includes a hollow fiber membrane module 9 obtained by arranging a plurality of hollow fiber membrane elements 10 of which hollow fiber membrane length direction is vertically arranged in parallel and fixing the same so as to support, and an air diffuser 15 arranged below the hollow fiber membrane module 9 with a required interval therebetween. The hollow fiber membrane element 10 is composed such that an upper opening end of a hollow fiber membrane sheet 11 in which a great number of porous hollow fiber membranes 10a are arranged in parallel is supported by a filtrate water take-out pipe 12 so as to be in communication with the same through a potting material 11a, a lower end thereof is blocked and supported to be fixed by a lower frame 13 through the potting material 11a similarly, and both ends of the filtrate water take-out pipe 12 and the lower frame 13 are supported by a pair of vertical rods 14. A great number of hollow fiber membrane elements 10 are accommodated in a substantial total volume of a rectangular cylindrical upper wall material 20 of which upper and lower end faces are opened and supported in parallel with a sheet surface arranged vertically.

Figure 3:
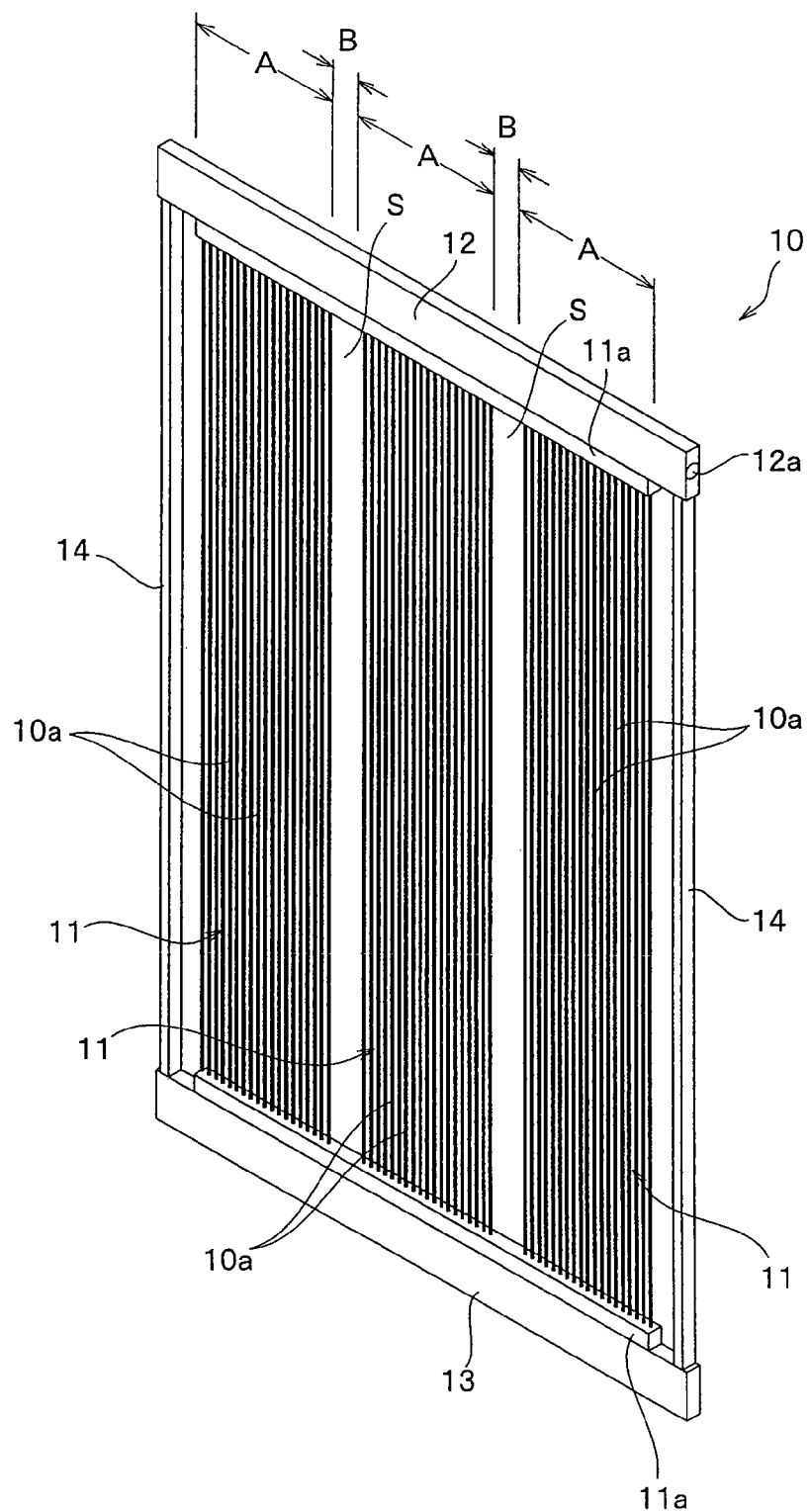
FIG. 3 is a perspective view schematically showing a configuration example of a hollow fiber membrane element being a component of a hollow fiber membrane module.
Figure 4:
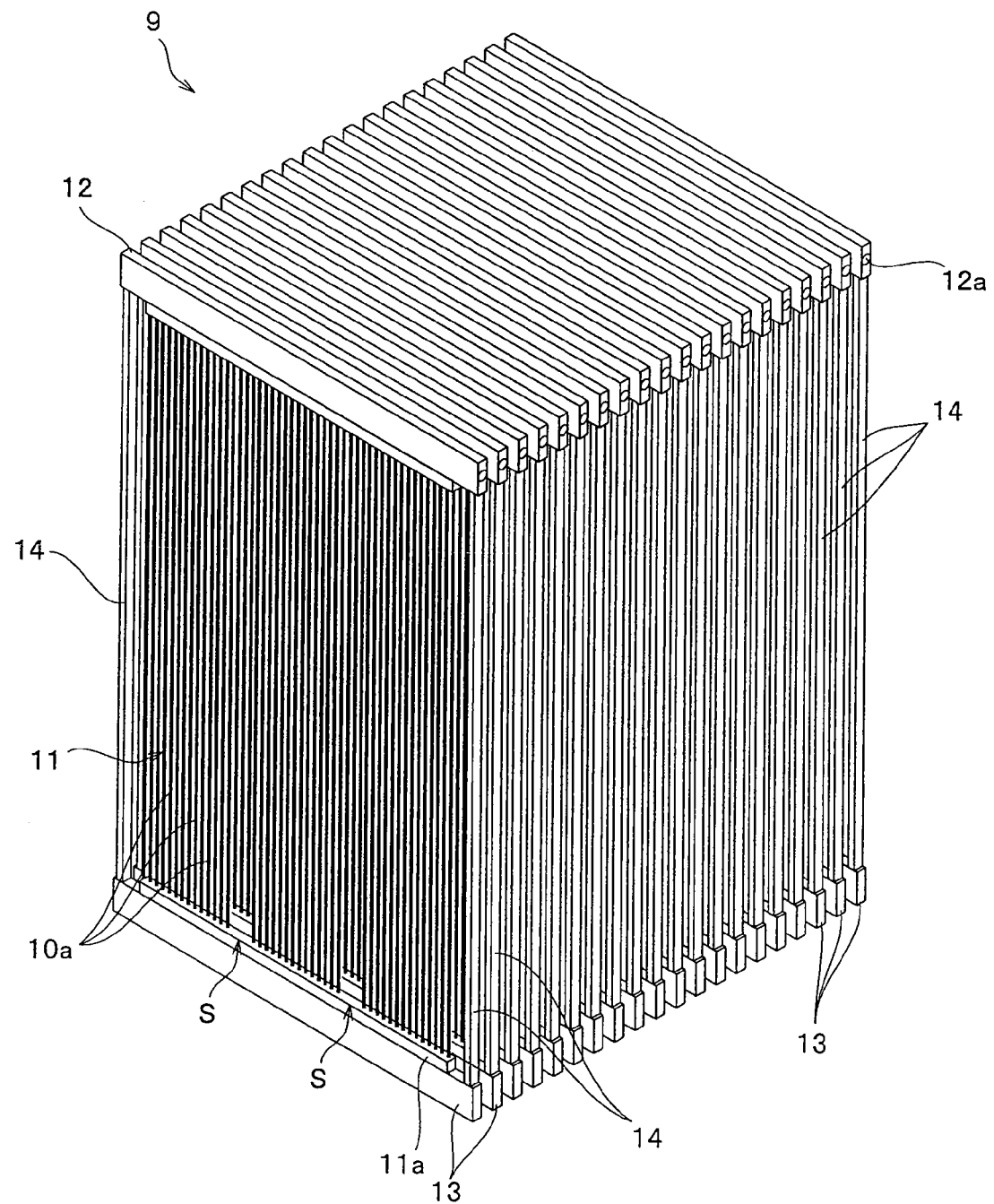
FIG. 4 is a cubic diagram showing an example of the hollow fiber membrane module being one of components of the membrane filter unit being a first example of the present invention.

Herein, in the above-described hollow fiber membrane element 10, in general, a great number of porous hollow fiber membranes are arranged in parallel on the same plane with same gaps, as shown in FIG. 2; however, in this example, as shown in FIGS. 3 and 4, a first area in which a predetermined number of the porous hollow fiber membranes 10a are arranged with a narrow gap is formed, thereafter the first area in which the same number of the porous hollow fiber membranes 10a are arranged with the same narrow gap is formed with a second area with a gap larger than the above-described gap interposed between the first areas, then the second area with the large gap is formed, and they are repeated. The large gap composes a residue eliminating mechanism in the present invention for eliminating residues such as fiber, fiber yarn and a paper piece.

In this example, a porous hollow fiber of polyvinylidene-fluoride (PVDF), which is hollow in a length direction thereof along a center portion, is used as the hollow fiber membrane 10a, and a pore diameter of a filter pore thereof is 0.4 µm. Also, an effective membrane area per sheet is 25 m$^2$. 20 sheet-like hollow fiber membrane elements 10 are used for each membrane filter unit 5, and a size thereof is 30 mm in depth, 1250 mm in width and 2000 mm in length from an upper surface of the filtrate water take-out pipe 12 to a lower surface of the lower frame 13. A size of one membrane filter unit 5 including the air diffuser 15 is 1552.5 mm in depth, 1447 mm in width and 3043.5 mm in height. The above-described filtrate water take-out pipe 12 is 1280 mm in length and made of ABS resin, and a material of the vertical rod 14 is SUS304. Also, in the illustrated example, a total number of the porous hollow fiber membranes 10a arranged between the filtrate water take-out pipe 12 and the lower frame 13 is 1575, and they are divided in three and two second areas having the large gap are formed every 525 porous hollow fiber membranes 10a as shown in FIG. 3. The large gap is 20 mm.

However, the material of the porous hollow fiber membrane 10a, the filtrate water take-out pipe 12 and the vertical rod 14, the size of the hollow fiber membrane element 10, the size of one membrane filter unit 5 and the number of hollow fiber membrane elements 10 per one unit may be variably changed according to intended purposes. For example, the number of the hollow fiber membrane elements 10 may be optionally set to 20, 40, and 60 and so on corresponding to throughput, or as the material of the porous hollow fiber membrane 10a, conventionally known materials such as a cellulosic material, a polyolefin material, a polysulfone material, a polyvinyl alcoholic material, polymethylmethacrylate and polyethylene-fluoride may be applied.

A take-out opening 12a of high quality treated water obtained by filtration by each porous hollow fiber membrane 10a is formed on one end of the above-described filtrate water take-out pipe 12 of each hollow fiber membrane element 10. In this example, an L-shaped joint 12b is liquid tightly attached to each take-out opening 12a by means of a sealing material as in the membrane filter unit 5 shown in FIG. 2. Also, a catchment header pipe 21 is laterally arranged along an end edge of an upper end of the above-described upper wall material 20 on a side on which the take-out opening 12a is formed. In the catchment header pipe 21, a catchment opening 21a is formed on each position corresponding to a plurality of the take-out openings 12a, and an L-shaped joint 21b similar to that of the take-out opening 12a is liquid tightly attached to each catchment opening 21a by means of the sealing member. The treated water take-out opening 12a of the filtrate water take-out pipe 12 and the catchment opening 21a of the catchment header pipe 21 are coupled to each other such that water may pass therethrough by connecting the L-shaped joints 12b and 21b attached thereto. A water intake 21c connected to the suction pump Pv through a suction pipe line 22 is formed on one end of the catchment header pipe 21. The water intake 21c formed for each catchment header pipe 21 and the suction pipe line 22 are coupled to each other through an open/close valve 23 disposed in a branching pipe line 22a branched from the suction pipe line 22 as shown in FIG. 1.

Figure 5:
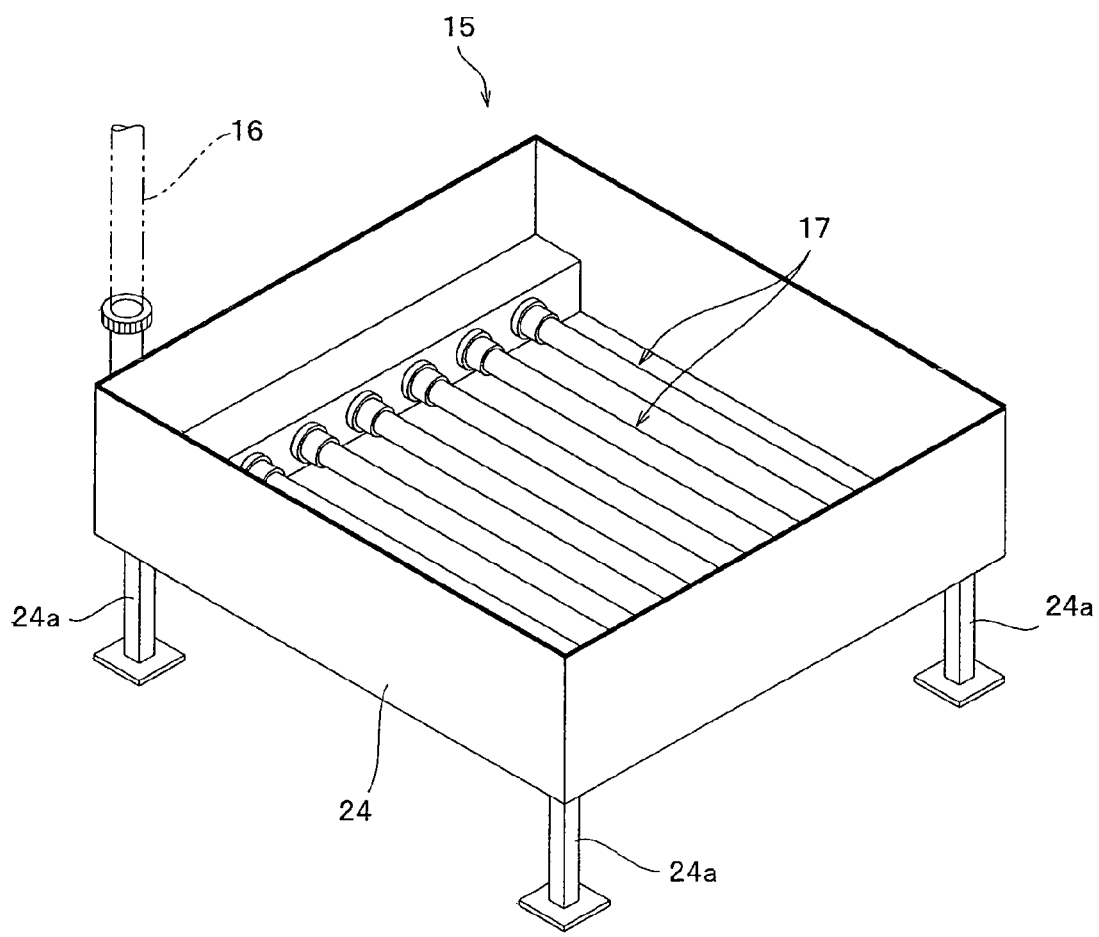
FIG. 5 is a cubic diagram of an air diffuser being one of the components of the membrane filter unit.

On the other hand, as shown in FIG. 5, the air diffuser 15 is formed of a similar rectangular cylinder of which top and bottom are opened, which is joined to a lower end of the upper wall material 20, and is accommodated in and fixed to a bottom portion of a lower wall material 24 provided with four support columns 24a extending downward from lower ends of four corners thereof. The air diffuser 15 is horizontally extended in a width direction along an inner wall surface of a front side of the lower wall material 24, and has an air introducing pipe (branching pipe line) 16 connected to an externally arranged blower C through a pipe as shown in FIG. 1, and a plurality of diffusing pipes 17 arranged in a length direction of the air introducing pipe (branching pipe line) 16 at predetermined intervals with one end fixed and the other end horizontally fixed along an inner wall surface on a rear surface side. An end of the diffusing pipe 17 on a side connected to the air introducing pipe (branching pipe line) 16 communicates with an inner side of the air introducing pipe (branching pipe line) 16, and the other end of the diffusing pipe 17 is blocked.

According to an illustrated example, a main body of the diffusing pipe 17 is composed of a rubber pipe with slit, and a slit not shown, which communicates with inside and outside along a length direction thereof is formed on a horizontally arranged lower surface. The air diffuser 15 is preferably arranged below the lower end of the above-described hollow membrane element 10 with an interval of 45 cm, and it is desirable that the support columns 24a are protruded downward from the lower wall material 24 to be exposed to the outside in order to allow the sludge to smoothly flow. At that time, in order to set the DOC at the site at which the circulated fluid (sludge) is taken out of the aeration tank 4 to 0.5 mg/L or less, the site at which the sludge is taken out is preferably located below the membrane filter unit 5 with the distance of 20 cm or longer, and it is further preferable that the distance is 30 cm or longer as described above. Also, the air diffuser 15 according to this example is arranged so as to correspond to each of a plurality of membrane filter units 5, and has an air main pipe 18 directly connected to an aeration blower C for branching the air sent from the same aeration blower C to each air diffuser 15, and is connected from the same air main pipe 18 through the air introducing pipe (branching pipe line) 16 of each air diffuser 15.

In a case in which a plurality of second areas B having a large gap S are provided between first areas A with the narrow gap in which a predetermined number of porous hollow fiber membranes 10a are arranged in parallel with the narrow gap, in the hollow fiber membrane element 10, as the membrane filter unit in the illustrated example provided with the above-described configuration also, when a gas-liquid mixed flow of minute bubbles released from the air diffuser 15 and the sludge includes the same to move upwardly enters an inner space of the hollow fiber membrane module 9 of the membrane filter unit 5, the residues such as the fiber and hair or the fiber yarn and the paper piece mixed into the gas-liquid mixture flow, also enter the inner space of the hollow fiber membrane module 9.

When the hollow fiber membrane element at that time is composed of the porous hollow fiber membranes arranged in parallel with identical narrow gaps as in the conventional case, the residues, which enter the hollow fiber membrane module 9, often get stuck on the porous hollow fiber membrane, the lower frame, the filtrate water take-out pipe 12 and the like to tightly bundle a plurality of surrounding porous hollow fiber membranes, or the residues are often collected to entwine with each other and are attached to a membrane surface of the hollow fiber membrane element 10 in a state solidified into a ball-shape. A flow amount of the gas-liquid mixed flow, which flows between each of the membrane elements in the hollow fiber membrane module 9 is large due to a relatively large space, and almost the entire flow directly flows toward the upper portion of the hollow fiber membrane module 9 as an upward flow and the residues mixed into the gas-liquid mixed flow often get stuck on the filtrate water take-out pipe 12 on the upper end and the like. On the other hand, in the gas-liquid mixed flow, which flows through a little space between adjacent porous hollow fiber membranes, a flow in a crossing direction is little in the above-described first area A having the narrow gaps and this becomes a disturbed flow due to oscillation by scrubbing between the adjacent porous hollow fiber membranes, and the residues mixed into the gas-liquid mixed flow move in the flow, which lacks direction, to get stuck on any of the surrounding porous hollow fiber membranes. This occurs repeatedly, and thereafter, the residues entwine with the surrounding porous hollow fiber membranes to tightly bundle a plurality of porous hollow fiber membranes.

When the residues get stuck to bundle a plurality of porous hollow fiber membranes 10a in this manner, the hollow fiber membranes 10a stick tightly to each other to block the filter pore of the hollow fiber membrane, so that filtration performance is significantly degraded and the excess sludge flows out of the tank. Also, as described above, when a mass of the residues is formed and is attached to the membrane surface, this also blocks up the filter pore of the hollow fiber membrane, thereby significantly degrading the filtration performance.

On the other hand, according to the illustrated example, although the gas-liquid mixed flow tends to move upward by making the large flow as in the conventional case in a space of the second area B having the large interval between the adjacent hollow fiber membrane elements 10, the second area B with the large gap is formed between the above-described first areas A in which the predetermined number of porous hollow fiber membranes 10a are arranged in parallel with the narrow gap of each hollow fiber membrane element 10, so that the large flow, which tends to flow upward in the large space between the hollow fiber membrane elements 10 is changed to flow across the second area B having the large gap formed between the first areas A obliquely upward. As a result, the disturbed flow generated in the first area A is drawn toward the flow, which flows across obliquely upward, thereby forming a flow, which flows across each porous hollow fiber membrane 10a. As a result, the residues, which tend to get stuck on the porous hollow fiber membrane 10a, for example, are carried by the flow, which flows across the porous hollow fiber membrane 10a, and is allowed to flow in the same direction, so that they do not get stuck on the porous hollow fiber membrane 10a. Therefore, the filter pore of the porous hollow fiber membrane 10a is not blocked due to an effect of the residues, and long-term usage of the membrane filter unit 5 becomes possible.

Figure 6:
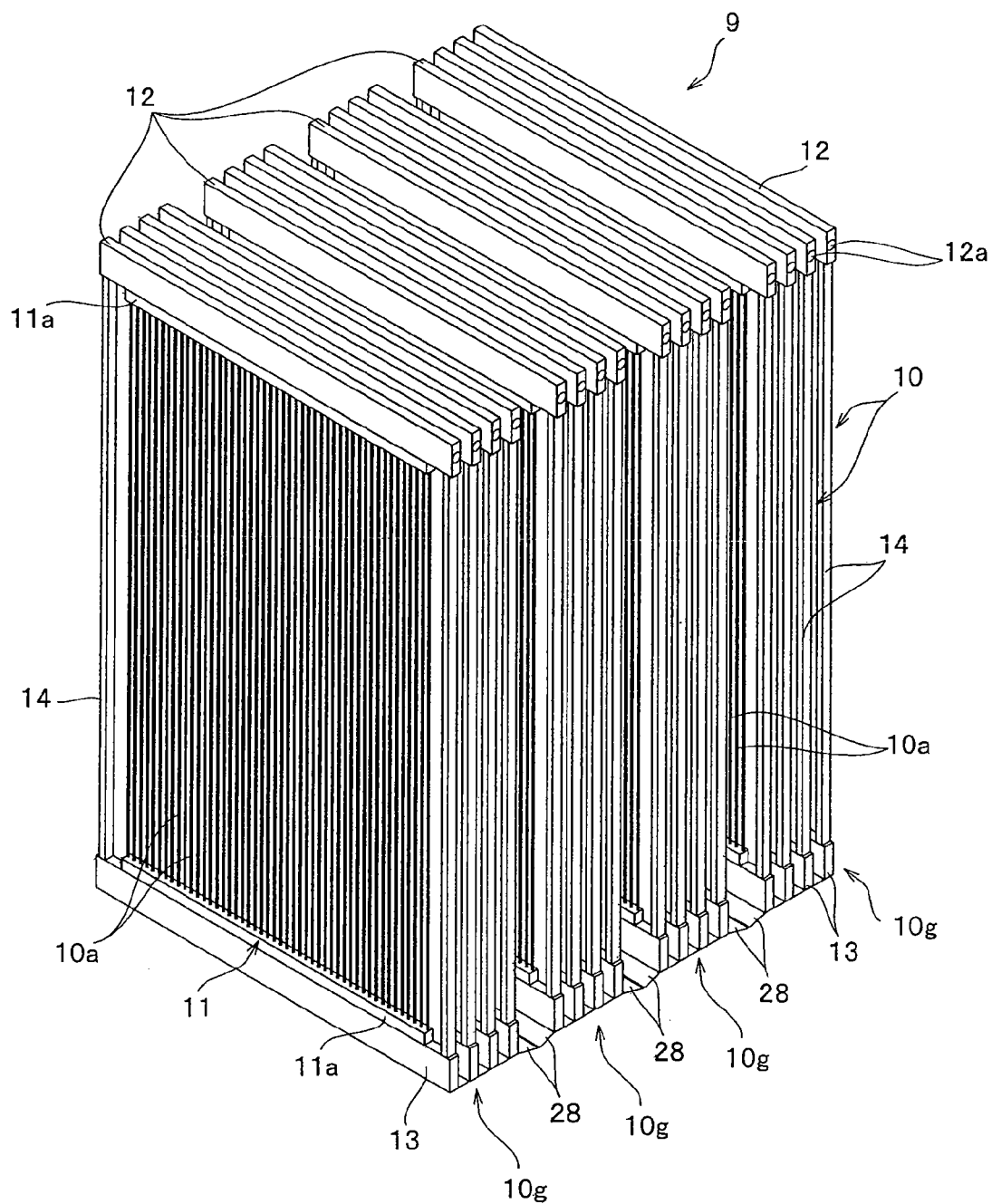
FIG. 6 is a cubic diagram schematically showing an example of the hollow fiber membrane module being a second example of the present invention.

FIG. 6 shows a typical second example of the present invention. According to this drawing, intervals between the hollow fiber membrane elements of the hollow fiber membrane module 9 are not made equal to each other, but a part of the intervals is made wider as in the case of the above-described Patent Document 2, for example. In the present invention, the part of the intervals between the hollow fiber membrane elements is made wider than other intervals, and further an interrupting member is arranged on a lower end opening of a large section formed by the wide interval so as to interrupt the gas-liquid mixed flow, which moves upward from below.

According to the illustrated example, elongated plate members 28 in pair are adopted as the interrupting member. In the second example, the pair of plate members 28 are fixed along opposing end edges of each lower frame 13 of the hollow fiber membrane elements 10 arranged with the interval, which forms a wide interval, therebetween. At that time, the opposing end edge of each plate member 28 is slightly inclined downward from a fixed end edge and a slight space is formed between tip end opposing edges.

In the membrane filter unit 5 according to the second example provided with such a configuration, the gas-liquid mixed flow, which flows upward from below the hollow fiber membrane module 9 toward a lower surface of the hollow fiber membrane module 9 is sorted to move toward an adjacent hollow fiber membrane element group 10g by the pair of plate members 28, and does not directly enter the wide interval space formed between the hollow fiber membrane elements 10. Therefore, in the gas-liquid mixed flow entering the hollow fiber membrane element group 10g adjacent to the wide interval space, the gas-liquid mixed flow sorted by the plate members 28 joins in addition to the gas-liquid mixed flow, which flows upward from below the hollow fiber membrane element group 10g.

The residues as described above are mixed into the gas-liquid mixed flow, which enters each hollow fiber membrane element group 10g in this manner. When the gas-liquid mixed flow including the residues enters each hollow fiber membrane element group 10g, an obliquely upward flow, which strongly flows toward the wide interval space formed above the plate members 28 is formed. Therefore, as in the case of the above-described first example, the residues mixed into the gas-liquid mixed flow tend to get stuck on the porous hollow fiber membrane 10a and the membrane surface on the way; however, they are guided to the wide gap space without getting stuck due to the strong flow, finally carried above by the flow, and eliminated from a portion above the hollow fiber membrane module 9 to outside of the wall material of the membrane filter unit 5. As a result, as in the case of the above-described example, the filter pore of the porous hollow fiber membrane 10a is not clogged due to the effect of the residues, so that the long-term usage of the membrane filter unit 5 becomes possible.

Figure 7:
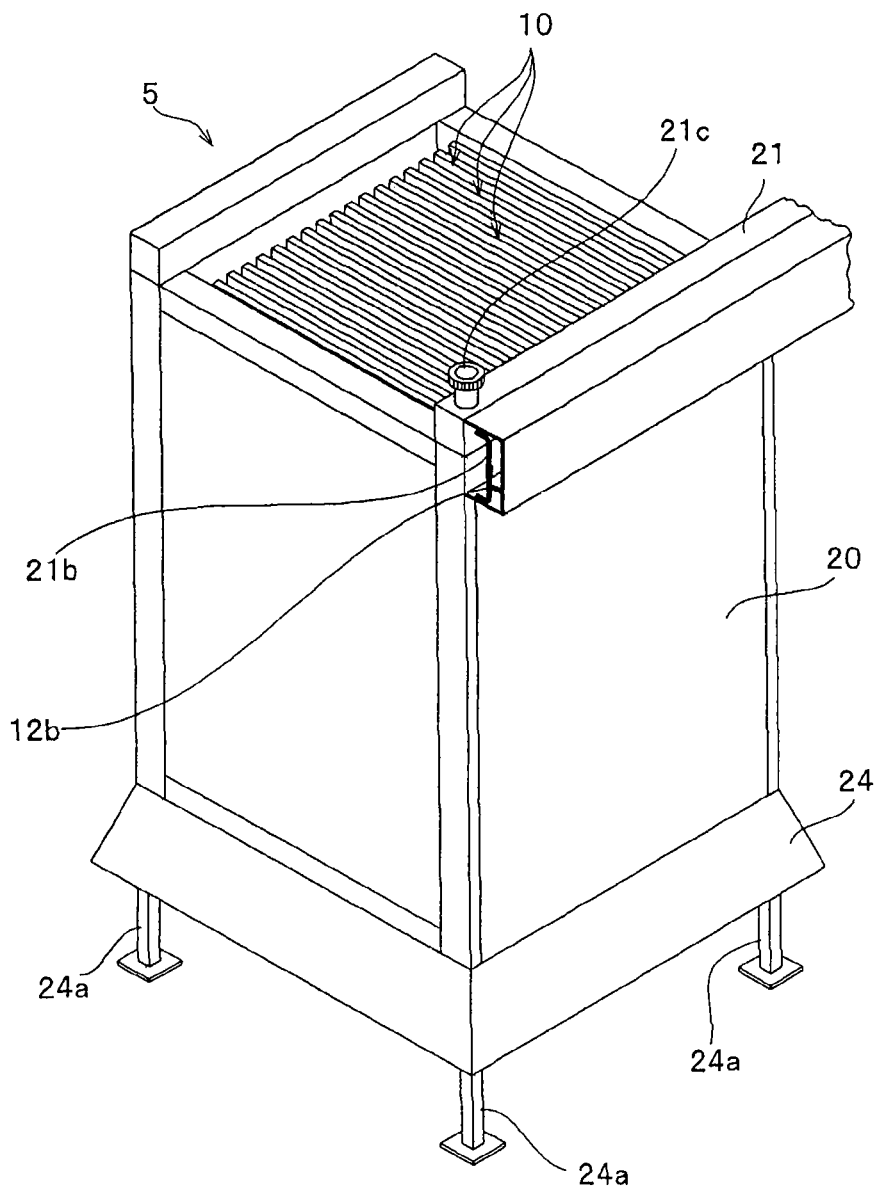
FIG. 7 is an external view schematically showing the membrane filter unit being a third example of the present invention.

FIG. 7 shows an external view of the membrane filter unit 5 being a typical third example of the present invention. In this example, as is easily understood from the drawing, the above-described lower wall material 24 arranged around the air diffuser 15 of the membrane filter unit 5 forms a skirt portion spreading downward. The skirt portion composes the residue eliminating mechanism of the present invention. Other configuration is substantially the same as the conventional configuration. It goes without saying that any one of the configurations of the first and second examples may be adopted, or both of them may be simultaneously adopted.

In this manner, by forming the lower end of the membrane filter unit 5 as the skirt portion, although the gas-liquid mixed flow in which the bubbles flowing downward the outer side of the upper wall material 20 are mixed temporarily flows in a diffusing direction along the skirt portion, the flow, which goes over the skirt portion, is gathered from an enlarged skirt lower end edge to an inner side by being drawn by the upward flow of the gas-liquid mixed flow generated by moving up of the bubbles released from the air diffuser 15 installed on the lower end of the membrane filter unit 5, thereby generating a large amount of the gas-liquid mixed flow. The gathered upward flow flows into the lower end of the hollow fiber membrane module 9 of which opening area of the lower end is smaller than that of the skirt portion. As a result, as compared to the membrane filter unit without the skirt portion, the flow amount flowing upward in the hollow fiber membrane module is increased, so that a scrubbing effect of the hollow fiber membrane element 10 is improved and the residues mixed into the gas-liquid mixed flow may be surely moved. As a result, as in the case of the above-described first and second examples, a long-life membrane filter unit 5 may be realized.

Also, when an extending length of the skirt portion in a horizontal direction is made shorter than 1 mm, a gathered amount of the gas-liquid mixed flow substantially is very little, and the flow amount will not increase as much as to eliminate the residues. Also, when this becomes longer than 1000 mm, the flow amount of the surrounding gas-liquid mixed flow to be gathered is too large, so that the flow amount of the surrounding gas-liquid mixed flow may not be gathered only by the upward flow of the gas-liquid mixed flow by the moving up of the bubbles generated by the air diffuser, to the contrary, the gas-liquid mixed flow, which passes through the inner side of the hollow fiber membrane module 9 does not reach the flow amount to surely carry the residues out of the module, then poor filtration due to the residues easily occurs. Also, when an inclination angle α of the skirt portion relative to a vertical line extending vertically downward from the lower end of the wall material is made smaller than 10 degrees, the increase amount of the gas-liquid mixed flow is small and a result is substantially similar to the conventional one. Also, when this is larger than 70 degrees, the above-described downward flow diffuses in various directions, so that the generation of a so-called swirling flow is disappeared and a mixing effect of the sludge is deteriorated.

The above description is that of the typical embodiment of the present invention, and although it is possible to adopt any one configuration of the above-described first to third examples, for example, it is also possible to appropriately combine the first to third examples, and various changes may be made in the present invention in an equivalent scope of claims.

The invention claimed is:
1. A membrane filter unit applied to an activated sludge treatment method comprising an anaerobic tank and an aerobic tank, with a membrane filter unit immersed in the aerobic tank, to sequentially biologically treat wastewater to separate into activated sludge and treated water, the membrane filter unit comprising:

a hollow fiber membrane module in which a plurality of sheet-like hollow fiber membrane elements, each element obtained by arranging a great number of porous hollow fiber membranes in parallel, are arrayed in parallel with the porous hollow fibers oriented in a vertical direction; and a minute bubble generating unit arranged below the hollow fiber membrane module for releasing minute bubbles toward a lower end of the module to generate a gas-liquid mixed flow vertically swirling between an inner space and an outer space of the hollow fiber membrane module when the membrane filter unit is applied to the activated sludge treatment method, wherein individual porous hollow fiber membranes within each hollow fiber membrane element are spaced apart from each other by a first area defining a narrow gap, a group of said porous hollow fiber membranes in each hollow fiber membrane element is spaced apart from adjoining group of said porous hollow fiber membranes in the same hollow fiber membrane element by second area that defines a wider gap than the narrow gap defined by the first area, a plurality of element groups are arranged in a parallel direction of the hollow fiber membrane module, wherein each element group comprises a plurality of spaced apart but adjacent hollow fiber membrane elements, and these element groups are spaced apart from each other at an interval that is wider than the spacing between individual hollow fiber membrane elements within an element group, and an interrupting member is arranged on a lower end entrance of the part of the intervals between the adjacent element groups for gas-liquid mixed flow, wherein the interrupting member sorts the gas-liquid mixed flow which flows upward from below the hollow fiber membrane module toward a lower surface of the hollow fiber membrane module to move toward an adjacent hollow fiber membrane element group.

2. The membrane filter unit according to claim 1, wherein said membrane unit further comprises a wall material arranged so as to enclose around the hollow fiber membrane module and the minute bubble generating unit, said wall material having a top and a bottom open, and said wall material having a skirt portion with a hem spread and extended on a lower end of the wall material.

3. The membrane filter unit accounting to claim 2, wherein an extending length of the skirt portion in a horizontal direction is 1 mm or longer and 1000 mm or shorter, and an inclination angle of the skirt portion relative to a vertical line extending vertically downward from a lower end of the wall material is 10 degrees or more and 70 degrees or less.

* * * * *